(12) United States Patent
Li et al.

(10) Patent No.: US 10,867,406 B2
(45) Date of Patent: Dec. 15, 2020

(54) UNMANNED AERIAL VEHICLE CALIBRATION METHOD AND SYSTEM BASED ON COLOR 3D CALIBRATION OBJECT

(71) Applicant: SUN YAT-SEN UNIVERSITY, Guangzhou (CN)

(72) Inventors: Xiying Li, Guangzhou (CN); Sijia Chen, Guangzhou (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 119 days.

(21) Appl. No.: 16/098,425

(22) PCT Filed: Sep. 19, 2017

(86) PCT No.: PCT/CN2017/102218
§ 371 (c)(1),
(2) Date: Nov. 1, 2018

(87) PCT Pub. No.: WO2018/103407
PCT Pub. Date: Jun. 14, 2018

(65) Prior Publication Data
US 2019/0147622 A1    May 16, 2019

(30) Foreign Application Priority Data
Dec. 9, 2016  (CN) .......................... 2016 1 1129565

(51) Int. Cl.
*G06T 7/80*     (2017.01)
*G06K 9/00*     (2006.01)
(Continued)

(52) U.S. Cl.
CPC .............. *G06T 7/80* (2017.01); *B64C 39/024* (2013.01); *B64D 47/08* (2013.01); *B64F 5/60* (2017.01);
(Continued)

(58) Field of Classification Search
CPC . G06T 7/80; G06T 7/536; G06T 2207/10024; G06T 2207/10032;
(Continued)

(56) References Cited

U.S. PATENT DOCUMENTS

2010/0134688 A1*  6/2010  Moriwake .......... G06K 9/00228
                                                      348/586
2013/0070094 A1   3/2013  Majumder et al.

FOREIGN PATENT DOCUMENTS

CN          1490765 A      4/2004
CN        100492413 C      5/2009
(Continued)

OTHER PUBLICATIONS

CN100492413C Yang et al, machine translated (Year: 2016).*
(Continued)

*Primary Examiner* — Jianxun Yang
(74) *Attorney, Agent, or Firm* — Davis Wright Tremaine LLP (57) ABSTRACT

An unmanned aerial vehicle calibration method and system based on a color 3D calibration object. The method comprises: placing a color chequerboard 3D calibration object in a scene to be photographed; using an unmanned aerial vehicle to photograph images of the color chequerboard 3D calibration object from at least three different orientations; using a vanishing point theory to linearly solve the internal parameters of a camera of the unmanned aerial vehicle according to the photographed images of the color chequerboard 3D calibration object; and using a coordinate projection transformation method to determine a geometric constraint relationship between a spatial position and the images of the camera of the unmanned aerial vehicle according to the internal parameters of the camera of the unmanned aerial vehicle.

14 Claims, 2 Drawing Sheets

(a)

(b)

(51) Int. Cl.
*G06T 7/536* (2017.01)
*B64F 5/60* (2017.01)
*B64C 39/02* (2006.01)
*B64D 47/08* (2006.01)
*G01C 11/08* (2006.01)
*G06K 9/20* (2006.01)

(52) U.S. Cl.
CPC ............ *G01C 11/08* (2013.01); *G06K 9/0063* (2013.01); *G06K 9/00201* (2013.01); *G06K 9/2063* (2013.01); *G06T 7/536* (2017.01); *B64C 2201/141* (2013.01); *G06T 2207/10024* (2013.01); *G06T 2207/10032* (2013.01); *G06T 2207/30204* (2013.01); *G06T 2207/30252* (2013.01)

(58) Field of Classification Search
CPC . G06T 2207/30204; G06T 2207/30252; G06T 2207/10004; G06T 2207/10016; G06T 2207/30181; G06T 2207/30208; G06T 2207/30244; G06T 17/10; G06T 15/506; B64F 5/60; B64C 39/024; B64C 2201/141; B64D 47/08; G01C 11/08; G06K 9/00201; G06K 9/0063; G06K 9/2063; G06K 9/00228; G03B 19/02
See application file for complete search history.

(56) References Cited

FOREIGN PATENT DOCUMENTS

| | | | |
|---|---|---|---|
| CN | 101504287 A | 8/2009 | |
| CN | 101576379 A | 11/2009 | |
| CN | 106651961 A | 5/2017 | |
| WO | WO-2016070318 A1 * | 5/2016 | ............... G06T 7/80 |

OTHER PUBLICATIONS

International Search Report dated Dec. 25, 2017, in International Patent Application No. PCT/CN2017/102218, filed Sep. 19, 2017, 6 pages including translation.

* cited by examiner

UNMANNED AERIAL VEHICLE CALIBRATION METHOD AND SYSTEM BASED ON COLOR 3D CALIBRATION OBJECT

TECHNICAL FIELD

The disclosure relates to the field of computer vision, and more particularly, to an unmanned aerial vehicle calibration method and system based on a color 3D calibration.

BACKGROUND

The final target in the field of computer vision research is to enable the computer to have the ability to perceive 3D environment as human. In this field, a 3D reconstruction process based on images is generally an inverse process restoring a 2D image to a 3D scene, and that is, the 2D image of target scene or object under different viewing angles is analyzed through the computer, and then the geometric information of 3D space of the scene or object is restored. 3D reconstruction has a wide range of applications in a variety of scenes and plays a huge role, such as the restoration display of precious historical relics and ancient buildings, the 3D reconstruction of medical human organs, the automatic driving of unmanned vehicles, etc., reconstruction of the scene and the object by ordinary digital camera has many advantages such as simplicity, economy, high efficiency, etc., and has a wide application prospect, which has far-reaching significance for the development of human society.

The unmanned aerial vehicle has many advantages such as simple structure, small size, light weight, low cost, convenient operation and flexible maneuverability, they can replace manned aircraft, ground vehicle and high-altitude worker to perform various tasks, greatly expands the operation region, reduces the risk of operation, and improves the efficiency of the operation. Therefore, in recent years, unmanned aerial vehicles such as remote-control fixed wing, multi-rotor, and helicopter are being used more and more in aerial mapping and aerial imaging to realize the mapping and modeling processes for large-area topographic map, engineering project, building, etc.

As an important branch of the field of computer vision, the 3D reconstruction mode of the scene and the object based on a motion camera such as the unmanned aerial vehicle generally uses an Euler geometric structure to reconstruct a linear algorithm framework, so as to calculate the 3D space point and the camera position, and orthographic projection and perspective projection are scaled to establish an affine camera that combines point, line and conic section features to obtain a sequence of images and estimate the scene structure. The sparse point cloud of a real scene can be obtained from the N-view 2D image using the SFM (Structure From Motion) principle, which is used to reconstruct the surface of the model, the 2D image is rich in texture, shading, silhouette and other useful information required in 3D reconstruction, a preliminary visual hull of the 3D model can be obtained using the silhouette, and the accuracy of the visual hull mainly depends on the silhouette accuracy, the number of views, the photographing angle, and other factors.

The 3D reconstruction mode of the scene based on the image sequences such as from the unmanned aerial vehicle mainly depends on image features and multi-view geometric constraints, and compared with traditional visual methods, the algorithm is intensive in calculation, higher computing power is required, and the research starts late. The solution of image features and multi-view geometric constraints, including determining the spatial points and camera positions in the sequence of images, and measuring or calibrating the geometric size and proportional constraint, has always been the key to determining the reconstruction accuracy.

In 3D reconstruction technology, it generally needs to photograph the image of the target object at multiple angles by a camera, and if the distance between the camera and the photographed object is fixed, the space available for reconstruction is very limited. For an outdoor scene, in the case that a relative position of the camera and the target object is not fixed, some parts of building with local features on site are usually selected manually, and feature points such as edges and corner points thereof are taken as marking points or reference objects, and then the scale and proportion constraints are provided in combination with manually and actually measured size and other information, so as to solve parameters of formulas such as affine transformation, thereby improving the accuracy of 3D reconstruction. Since the marking points and reference objects are uncertain, mapping is proceeded all the time, the measurement accuracy is not easy to guarantee, the actual operation is cumbersome, and there are many uncertain factors. If high-precision 3D reconstruction is to be achieved, it is necessary to set a calibration object. If a plane-type black and white checkerboard calibration object according to an existing ground close-range photography exploration method is simply adopted, it is difficult to provide 3D information; if two checkerboard calibration planes are combined, the requirements for observation and calibration of any position in the space cannot be met; and if the black and white checkerboards are used simultaneously on multiple surfaces of a cube, there are certain visual recognition difficulties and large errors for both the photographer and the photo user.

In addition, for the unmanned aerial vehicle, the position of the camera is constantly changing when a sequence of image is photographed, and the surround flight photographing mode is often used. In addition to calibrating the internal parameters of the camera, the spatial position of the camera itself is determined. Therefore, the industry has put forward new requirements for unmanned aerial vehicle calibration technology: on the one hand, the calibration object is easy for accurate measurement, the space position is standard and the placement operation is convenient; and on the other hand, according to the imaging features of the unmanned aerial vehicle, the calibration object can be photographed from any position in the space as much as possible, thereby conveniently obtaining the geometric constraint and spatial position of the photographed image sequence.

SUMMARY

In order to solve the technical problem above, one aspect of the present disclosure is to: provide an unmanned aerial vehicle calibration method based on a color 3D calibration object, which is easy for accurate measurement, has high detection precision, is convenient to install, has high versatility and is convenient to use.

Another aspect of the present disclosure is to: provide an unmanned aerial vehicle calibration system based on a color 3D calibration object, which is easy for accurate measurement, has high detection precision, is convenient to install, has high versatility and is convenient to use.

The technical solution adopted by the present disclosure is as follows.

An unmanned aerial vehicle calibration method based on a color 3D calibration object comprises the following steps of:

placing a color chequerboard 3D calibration object in a scene to be photographed, wherein the color chequerboard 3D calibration object is a closed 3D structure, the color chequerboard 3D calibration object comprises at least a top surface and a side surface, each surface of the color chequerboard 3D calibration object adopts a chequerboard image in color and white, color and black, two different colors, or black and white, wherein color combinations of the chequerboard images between any two adjacent surfaces are different;

using an unmanned aerial vehicle to photograph images of the color chequerboard 3D calibration object from at least three different orientations;

using a vanishing point theory to linearly solve internal parameters of a camera of the unmanned aerial vehicle according to the photographed images of the color chequerboard 3D calibration object; and using a coordinate projection transformation method to determine a geometric constraint relationship between a spatial position and the images of the camera of the unmanned aerial vehicle according to the internal parameters of the camera of the unmanned aerial vehicle.

Further, the color chequerboard 3D calibration object comprises but is not limited to a cube, a cuboid, a hexagonal prism, a hemisphere, and a cylinder.

Further, the colors of the checkerboard image on the surface of the color chequerboard 3D calibration object are combined in a way that the surface of the color chequerboard 3D calibration object adopts a checkerboard image in color and white, and an adjacent surface adopts a checkerboard image of two different colors; if the color chequerboard 3D calibration object is a 3D calibration object composed of a regular polyhedron, a total number Q of non-white colors needed thereof meets a condition: $3 \leq Q \leq maxPi$, wherein, $maxPi=\max\{Pi|i=1, 2, \ldots, b\}$ is a number of angle points of the color chequerboard 3D calibration object, $b<e$, e is a total number of surfaces of the color chequerboard 3D calibration object, Pi is a number of surfaces corresponding to any angle point i in the color chequerboard 3D calibration object and containing the angle point i, and maxPi is a maximum number of common angle point planes of the color chequerboard 3D calibration object; and if the color chequerboard 3D calibration object is a regular cube without an angle point, the number of colors needed thereof is the same as the number of surfaces.

Further, the top surface of the color chequerboard 3D calibration object adopts a checkerboard image in red and white or in red and black, and a side surface of the color chequerboard 3D calibration object adopts a checkerboard image in color other than red and white or in black and white.

Further, four adjustable lining feet or table-shaped trays are installed in on bottom surface of the color chequerboard 3D calibration object, and a bubble level is embedded in a top portion of the color chequerboard 3D calibration object.

Further, the step of using the vanishing point theory to linearly solve the internal parameters of the camera of the unmanned aerial vehicle according to the photographed images of the color chequerboard 3D calibration object comprises:

determining a model of the camera of the unmanned aerial vehicle and a mapping relationship between a homogeneous coordinate of a spatial point and a homogeneous coordinate of an image point; if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and using least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

The other technical solution adopted by the present disclosure is as follows.

An unmanned aerial vehicle calibration system based on a color 3D calibration object comprises:

a placing module configured to place a color chequerboard 3D calibration object in a scene to be photographed, wherein the color chequerboard 3D calibration object is a closed 3D structure, the color chequerboard 3D calibration object comprises at least a top surface and a side surface, each surface of the color chequerboard 3D calibration object adopts a chequerboard image in color and white, color and black, two different colors, or black and white, wherein color combinations of the chequerboard images between any two adjacent surfaces are different;

a photographing module configured to use an unmanned aerial vehicle to photograph images of the color chequerboard 3D calibration object from at least three different orientations;

an internal parameter solving module configured to use a vanishing point theory to linearly solve internal parameters of a camera of the unmanned aerial vehicle according to the photographed images of the color chequerboard 3D calibration object; and a coordinate projection conversion module configured to determine a geometric constraint relationship between a spatial position and the images of the camera of the unmanned aerial vehicle according to the internal parameters of the camera of the unmanned aerial vehicle.

Further, the colors of the checkerboard image on the surface of the color chequerboard 3D calibration object are combined in a way that the surface of the color chequerboard 3D calibration object adopts a checkerboard image in color and white, and an adjacent surface adopts a checkerboard image of two different colors; if the color chequerboard 3D calibration object is a 3D calibration object composed of a regular polyhedron, a total number Q of non-white colors needed thereof meets a condition: $3 \leq Q \leq maxPi$, wherein, $maxPi=\max\{Pi|i=1, 2, \ldots, b\}$, b is a number of angle points of the color chequerboard 3D calibration object, $b<e$, e is a total number of surfaces of the color chequerboard 3D calibration object, Pi is a number of surfaces corresponding to any angle point i in the color chequerboard 3D calibration object and containing the angle point i, and maxPi is a maximum number of common angle point planes of the color chequerboard 3D calibration object; and if the color chequerboard 3D calibration object is a regular cube without an angle point, the number of colors needed thereof is the same as the number of surfaces.

Further, four adjustable lining feet or table-shaped trays are installed on a bottom surface of the color chequerboard 3D calibration object, and a bubble level is embedded in a top portion of the color chequerboard 3D calibration object.

Further, the internal parameter solving module comprises:

an initializing unit configured to determine a model of the camera of the unmanned aerial vehicle and a mapping relationship between a homogeneous coordinate of a spatial point and a homogeneous coordinate of an image point: if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and a solving unit configured to use least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

The method of the present disclosure has the beneficial effects that: the steps of placing the color chequerboard 3D calibration object in the scene to be photographed, using the unmanned aerial vehicle to photograph images of the color chequerboard 3D calibration object from at least three different orientations, using the vanishing point theory to linearly solve internal parameters of the camera of the unmanned aerial vehicle according to the photographed images of the color chequerboard 3D calibration object, and using the coordinate projection transformation method to determine the geometric constraint relationship between the spatial position and the images of the camera of the unmanned aerial vehicle according to the internal parameters of the camera of the unmanned aerial vehicle are included, the camera is calibrated by the color chequerboard 3D calibration object, the 3D information can be provided and the color chequerboard 3D calibration object can be photographed from any orientation or any angle in space, and the different color combinations are arranged in the checkerboard images of any two adjacent surfaces of the color chequerboard 3D calibration object to facilitate visual recognition by the photographer and the photo user, which is easy to measure accurately, has high detection precision, is easy to place and has strong versatility; and the calibration of the internal parameters of the camera only needs to be finished through photographing the images of the color chequerboard 3D calibration object from at least three different orientations and obtaining the internal parameters of the camera of the unmanned aerial vehicle in the combination of the vanishing point theory, and then the geometric constraint relationship between the spatial position and the images of the camera of the unmanned aerial vehicle can be expediently obtained through the coordinate projection transformation method, which is easier to use.

The system of the present disclosure has the beneficial effects that: the placing module, the photographing module, the internal parameter solving module and the coordinate projection conversion module are included, the camera is calibrated by the color chequerboard 3D calibration object, the 3D information can be provided and the color chequerboard 3D calibration object can be photographed from any orientation or any angle in space, and the different color combinations are arranged in the checkerboard images of any two adjacent surfaces of the color chequerboard 3D calibration object to facilitate visual recognition by the photographer and the photo user, which is easy to measure accurately, has high detection precision, is easy to place and has strong versatility; and the calibration of the internal parameters of the camera only needs to be finished through photographing the images of the color chequerboard 3D calibration object from at least three different orientations and obtaining the internal parameters of the camera of the unmanned aerial vehicle in the combination of the vanishing point theory, and then the geometric constraint relationship between the spatial position and the images of the camera of the unmanned aerial vehicle can be expediently obtained through the coordinate projection transformation method, which is easier to use.

DETAILED DESCRIPTION

Figure 1:
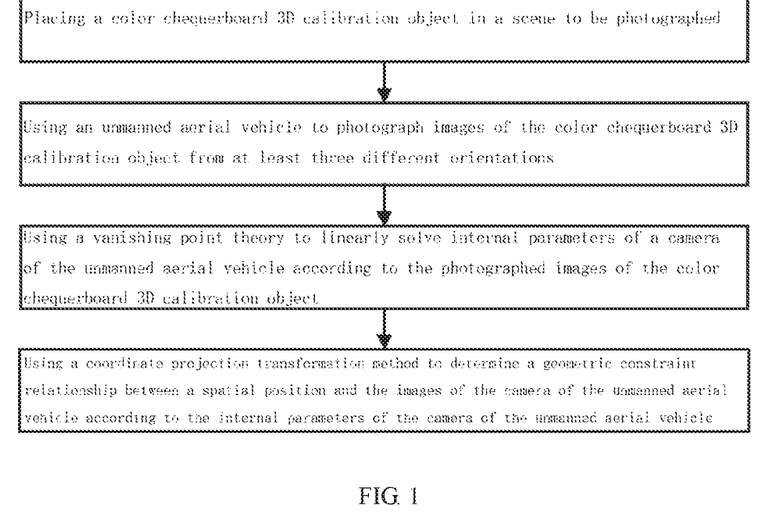
FIG. 1 is an overall flow chart of an unmanned aerial vehicle calibration method based on a color 3D calibration object of the present disclosure.

Referring to FIG. 1, an unmanned aerial vehicle calibration method based on a color 3D calibration object comprises the following steps of:

placing a color chequerboard 3D calibration object in a scene to be photographed, wherein the color chequerboard 3D calibration object is a closed 3D structure, the color chequerboard 3D calibration object comprises at least a top surface and a side surface, each surface of the color chequerboard 3D calibration object adopts a chequerboard image in color and white, color and black, one color and another different color, or black and white, and color combinations of the chequerboard images of any two adjacent surfaces are different;

using an unmanned aerial vehicle to photograph images of the color chequerboard 3D calibration object from at least three different orientations;

using a vanishing point theory to linearly solve internal parameters of a camera of the unmanned aerial vehicle according to the photographed images of the color chequerboard 3D calibration object; and using a coordinate projection transformation method to determine a geometric constraint relationship between a spatial position and the images of the camera of the unmanned aerial vehicle according to the internal parameters of the camera of the unmanned aerial vehicle.

Each surface of the color chequerboard 3D calibration object has two colors, and that is, the checkerboard image of each surface is formed by two alternatively arranged checkerboards in two different colors.

Further, as a preferred embodiment, the color chequerboard 3D calibration object comprises but is not limited to a cube, a cuboid, a hexagonal prism, a hemisphere, and a cylinder.

Further, as a preferred embodiment, a color combination mode of the checkerboard image on the surface of the color chequerboard 3D calibration object is that a surface of the color chequerboard 3D calibration object adopts the checkerboard image in color and white, and an adjacent surface adopts a checkerboard image of two different colors; if the color chequerboard 3D calibration object is a 3D calibration object composed of a regular polyhedron, a total number Q of non-white colors needed thereof meets a condition: 3≤Q≤maxPi, wherein, maxPi=max{Pi|i1, 2, . . . , b}, m is a number of angle points of the color chequerboard 3D calibration object, b<e, b is a total number of surfaces of the color chequerboard 3D calibration object, Pi is the number of surfaces corresponding to any angle point i in the color chequerboard 3D calibration object and containing the angle point i, and maxPi is a maximum number of common angle point planes of the color chequerboard 3D calibration object; and if the color chequerboard 3D calibration object is a regular cube without an angle point, the number of colors needed thereof is the same as the number of surfaces.

Further, as a preferred embodiment, the top surface of the color chequerboard 3D calibration object adopts a checkerboard image in red and white or in red and black, and a side surface of the color chequerboard 3D calibration object adopts a checkerboard image in color other than red and white, or in black and white.

Further, as a preferred embodiment, four adjustable lining feet or table-shaped trays are installed on a bottom surface of the color chequerboard 3D calibration object, and a bubble level is embedded in a top portion of the color chequerboard 3D calibration object.

Further, as a preferred embodiment, the step of using the vanishing point theory to linearly solve the internal parameters of the camera of the unmanned aerial vehicle according to the photographed images of the color chequerboard 3D calibration object comprises:

determining a model of the camera of the unmanned aerial vehicle and a mapping relationship between a homogeneous coordinate of a spatial point and a homogeneous coordinate of an image point; if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and using least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

Referring to FIG. 1, an unmanned aerial vehicle calibration system based on a color 3D calibration object, comprising:

a placing module configured to place a color chequerboard 3D calibration object in a scene to be photographed, wherein the color chequerboard 3D calibration object is a closed 3D structure, the color chequerboard 3D calibration object comprises at least a top surface and a side surface, each surface of the color chequerboard 3D calibration object adopts a chequerboard image in color and white, color and black, two different colors, or black and white, and color combinations of the chequerboard images between any two adjacent surfaces are different;

a photographing module configured to use an unmanned aerial vehicle to photograph images of the color chequerboard 3D calibration object from at least three different orientations;

an internal parameter solving module configured to use a vanishing point theory to linearly solve internal parameters of a camera of the unmanned aerial vehicle according to the photographed images of the color chequerboard 3D calibration object; and a coordinate projection conversion module configured to determine a geometric constraint relationship between a spatial position and the images of the camera of the unmanned aerial vehicle according to the internal parameters of the camera of the unmanned aerial vehicle.

Further, as a preferred embodiment, the colors of the checkerboard image on the surface of the color chequerboard 3D calibration object are combined in a way that the surface of the color chequerboard 3D calibration object adopts a checkerboard image in color and white, and an adjacent surface adopts a checkerboard image of two different colors; if the color chequerboard 3D calibration object is a 3D calibration object composed of a regular polyhedron, a total number Q of non-white colors needed thereof meets a condition: 3≤Q≤maxPi, wherein, maxPi=max{Pi|i=1, 2, . . . , b}, b is a number of angle points of the color chequerboard 3D calibration object, b<e, e is a total number of surfaces of the color chequerboard 3D calibration object, Pi is a number of surfaces corresponding to any angle point i in the color chequerboard 3D calibration object and containing the angle point i, and maxPi is a maximum number of common angle point planes of the color chequerboard 3D calibration object; and if the color chequerboard 3D calibration object is a regular cube without an angle point, the number of colors needed thereof is the same as the number of surfaces.

Further, as a preferred embodiment, four adjustable lining feet or table-shaped trays are installed on a bottom surface of the color chequerboard 3D calibration object, and a bubble level is embedded in a top portion of the color chequerboard 3D calibration object.

Further, as a preferred embodiment, the internal parameter solving module comprises:

an initializing unit configured to determine a model of the camera of the unmanned aerial vehicle and a mapping relationship between a homogeneous coordinate of a spatial point and a homogeneous coordinate of an image point: if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and a solving unit configured to use least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

The disclosure is further explained and described below with reference to the drawings and specific embodiments of the description.

First Embodiment

With respect to the problems of the prior art, including difficulty in accurate measurement, low detection accuracy, inconvenient installation, poor versatility and inconvenient use, the present disclosure provides a new unmanned aerial vehicle calibration method and system. The calibration process of the unmanned aerial vehicle according to the present disclosure comprises two aspects: one aspect is to design a 3D calibration object that is easy for accurate measurement, standard and easy to operate, and the other aspect is to provide a method for parameter calibration of the camera and geometric constraint of the image. The contents of these two aspects are described in detail below.

(I) Design of 3D Calibration Object

In order to facilitate the observation by an operator during the photographing operation and the recognition when a photograph is exported for processing at a later phase, and to facilitate the proportional constraint setting at different angles in a modeling scene after a 3D modeling, a surface of the unmanned aerial vehicle calibration object must have a 3D spatial structure relationship, and different space points can be conveniently distinguished. To this end, the present disclosure provides a design of a color chequerboard 3D calibration object, and the 3D calibration object has the following features.

(1) The 3D calibration object is a closed 3D structure comprising at least a top surface and a side surface, such as a regular polyhedron of a cube, a cuboid or a hexagonal prism, and a hemisphere, a cylinder, etc.

(2) A surface of the 3D calibration object adopts a chequerboard image in color and white, color and black, two different colors, or black and white, and the surface is rendered according to the following rules.

1) An adjacent surface of the 3D calibration object adopts a chequerboard image in different colors (or black) and white (or black), and the number of the checkerboards is an integer. Checkerboards along the boundary between every two surfaces shall be kept in color (or black) and white (or black) as much as possible.

Figure 2:
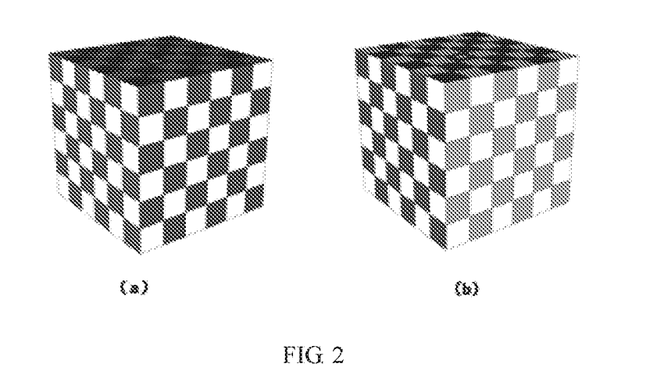
FIG. 2 is a schematic diagram of two specific color matching schemes for a surface of a color chequerboard 3D calibration object.

2) Complete rendering scheme: the adjacent surfaces of the 3D calibration object adopt the checkerboard image in different colors (or black) and white, the checkerboards along the boundary between every two surfaces is kept in color and white (or black), i.e., when the patterns of any two adjacent surfaces are unfolded into a plane, the chequerboard pattern in color and white (or black) is continued, and adjacent white blocks, or adjacent color blocks will not appear. As shown in FIG. 2(a), a top surface of a regular cube is a red and black checkerboard image, and a side surface is a green and white, or blue and white checkerboard image.

3) Simple rendering scheme: a surface of the 3D calibration object adopts the checkerboard image in color and white, and an adjacent surface adopts a checkerboard image in two different colors.

4) For the 3D calibration object formed by a regular polyhedron, the total number of colors is determined by the number of common angle point planes of the polyhedron, which is specifically as follows:

when a number of angle points of a regular cube calibration object is set as b, a total number of surfaces is e, and for any angular point i, a number of surfaces containing the angular point is Pi, a maximum number of common angle point planes of the cube calibration object is maxPi=max{Pi|i=1, 2, . . . , b}; and a number Q of non-white colors (i.e. colors and black, excluding white) needed thereof meets a condition: 3≤Q≤maxPi.

For a regular cube calibration object without an angular point, the number of colors is the same as the number of surfaces.

5) The top surface of the general 3D calibration object adopts the chequerboard pattern in red and white (or black), and the side surface adopts the chequerboard pattern in color (or black) other than red and white.

6) When the number of colors is 3, the color is preferred to be red, green and blue, and at the moment, the complete rendering scheme is provided as, a checkerboard pattern in red and black disposed in the top surface, and checkerboard pattern in green and white, and blue and white being sequentially disposed on adjacent side surfaces; and in the simple rendering scheme, chequerboard patterns are constructed in red and white, green and white, and blue and white on the adjacent surfaces.

(3) In order to ensure that at least 2*2 checks (the basic unit of the checkerboard) with clear edges and nodes are provided, one surface of the 3D calibration object has at least 4*4 checks, and a side length of each check is provided with a fixed length (such as 10 cm, 20 cm, etc.).

(4) The surface of the checkerboard is made of mat material to ensure that the problem of photograph overexposure caused by light reflection does not exist when the surface of the calibration object is photographed by the unmanned aerial vehicle at different angles.

(5) In order to keep the cube calibration object horizontal while placing, four adjustable lining feet or table-shaped trays can be additionally installed at a base of the cube calibration object, and a bubble level can be embedded in a top portion of the object.

Through adopting different color pattern rendering modes for different surfaces of the color chessboard 3D calibration object in the present disclosure, a calibration value of a spatial position of a photographing region is effectively provided and a size ratio constraint is determined in the image photographing of the 3D reconstruction, which significantly enhances the precision of reconstruction result and the accuracy of 3D measurement. The color checkerboard 3D calibration object designed by the present disclosure is small in size and convenient to use, and is especially applied to scale calibration in various outdoor aerial photography applications.

(II) Method for Parameter Calibration of the Camera and Determination of Geometric Constraint of the Image At present, many researches on the camera calibration method are conducted, wherein the classic algorithm comprises DLT calibration method proposed by Tsai, RAC calibration method proposed by Heikkila, and plane calibration method proposed by Zhang Zhengyou. The present disclosure provides a linear camera self-calibration method based on the color chequerboard 3D calibration object, which only needs to photograph the images of the color chequerboard 3D calibration object placed in the scene to be photographed from three or more different orientations, so as to use the vanishing point theory to linearly solve the internal parameters of the camera, and then the classic coordinate projection transformation method is used to determine the geometric constraint relationship between the spatial position and the images of the camera. The specific implementation process of the method is as follows.

(1) Calibration of internal parameters of the camera.

Assuming that the camera model is a classic pinhole camera model, and setting P as an arbitrary spatial point, a homogeneous coordinate of the spatial point P is $M=(x_w, y_w, z_w, 1)^T$, and a homogeneous coordinate of an image point is $m=(u, v, 1)^T$. From a geometric relationship of perspective projection, the relationship between M and m can be obtained as follows:

$$\lambda m = K[RT]M \quad (1)$$

wherein, $\lambda$ is a given scale factor;

$$K = \begin{bmatrix} f_u & s & u_0 \\ 0 & f_v & v_0 \\ 0 & 0 & 1 \end{bmatrix}$$

is an internal parameter matrix of the camera; R is a rotation matrix from a world coordinate system to a camera coordinate system; and T is a translation vector from the world coordinate system to the camera coordinate system.

(2) Calibration of internal parameter matrix of the camera by a color chequerboard 3D calibration object.

Figure 3:
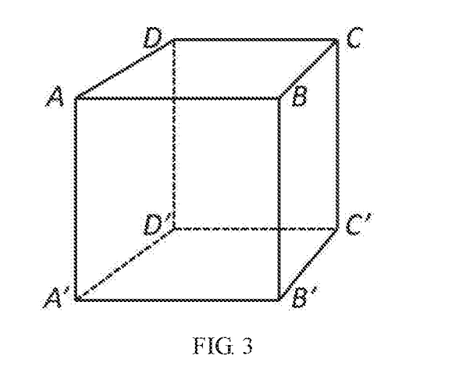
FIG. 3 is a schematic diagram illustrating the structure of a model of a cube calibration object.

A model of the color chequerboard 3D calibration object is shown in FIG. 3.

Figure 4:
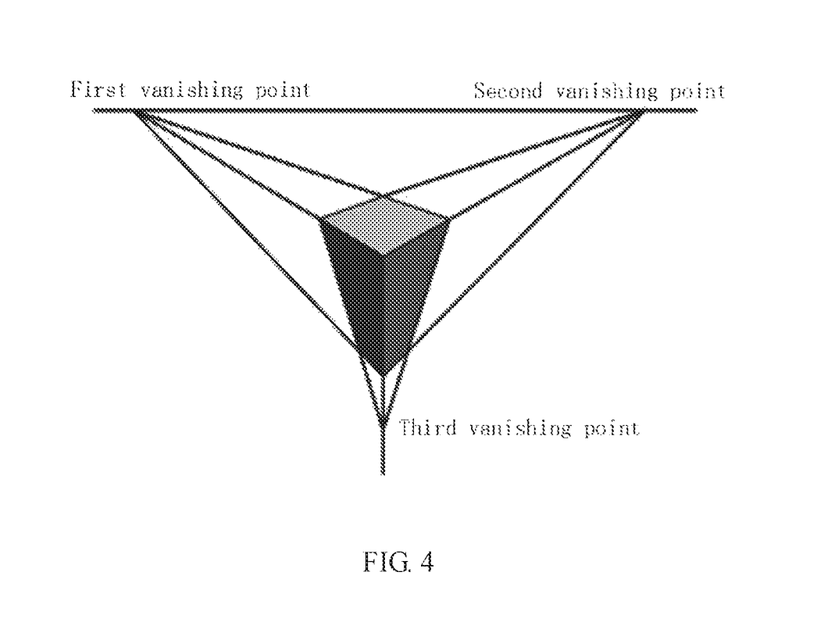
FIG. 4 is a schematic diagram of a fitting process of a vanishing point.

1P, 2P and 3P are respectively set as the vanishing points of straight lines AB, AA' and AD, and the coordinates are denoted as $P_1(u_{P_1}, v_{P_1})$, $P_2(u_{P_2}, v_{P_2})$ and $P_3(u_{P_3}, v_{P_3})$. As shown in FIG. 4, least square method is used to fit the straight line AB and a straight line cluster parallel to AB to obtain the vanishing point $P_1(u_{P_1}, v_{P_1})$. Similarly, the vanishing point $P_2$ corresponding to AA' and the vanishing point $P_3$ corresponding to AD can be obtained.

According to the vanishing point theory, the following constraint equation is provided:

$$\begin{cases} P_1^T \omega P_2 = 0 \\ P_2^T \omega P_3 = 0 \\ P_1^T \omega P_3 = 0 \end{cases} \quad (2)$$

let $C = K^{-T}K^{-1} = \begin{bmatrix} c_1 & c_2 & c_3 \\ c_2 & c_4 & c_5 \\ c_3 & c_5 & c_6 \end{bmatrix}$, it can be obtained through formula (2) as follows:

$$\begin{cases} u_{P_1}u_{P_4}c_1 + (u_{P_1}v_{P_4} + u_{P_4}v_{P_1})c_2 + (u_{P_1} + u_{P_4})c_3 + v_{P_1}v_{P_4}c_4 + (v_{P_1} + v_{P_4})c_5 + c_6 = 0 \\ u_{P_2}u_{P_5}c_1 + (u_{P_2}v_{P_5} + u_{P_5}v_{P_2})c_2 + (u_{P_2} + u_{P_5})c_3 + v_{P_2}v_{P_5}c_4 + (v_{P_2} + v_{P_5})c_5 + c_6 = 0 \\ u_{P_3}u_{P_6}c_1 + (u_{P_3}v_{P_6} + u_{P_6}v_{P_3})c_2 + (u_{P_3} + u_{P_6})c_3 + v_{P_3}v_{P_6}c_4 + (v_{P_3} + v_{P_6})c_5 + c_6 = 0 \end{cases} \quad (3)$$

let $f = [c_1, c_2, c_3, c_4, c_5, c_6]^T$, $$A = \begin{bmatrix} u_{P_1}u_{P_4} & u_{P_1}u_{P_4}+u_{P_4}u_{P_1} & u_{P_1}+u_{P_4} & v_{P_1}v_{P_4} & v_{P_1}+v_{P_4} & 1 \\ u_{P_2}u_{P_5} & u_{P_2}u_{P_5}+u_{P_5}u_{P_2} & u_{P_2}+u_{P_5} & v_{P_2}v_{P_5} & v_{P_2}+v_{P_5} & 1 \\ u_{P_3}u_{P_6} & u_{P_3}u_{P_6}+u_{P_6}u_{P_3} & u_{P_3}+u_{P_6} & v_{P_3}v_{P_6} & v_{P_3}+v_{P_6} & 1 \end{bmatrix},$$

then the formula (3) can be expressed as: $Af=0$.

3n equations related to a matrix C can be obtained by photographing n (n is an integer greater than or equal to 3) images of the color chequerboard 3D calibration object from different orientations, and then, f is linearly solved by the least square method, so as to obtain the matrix C; and finally, an internal parameter matrix K of the camera can be linearly solved by the classic Zhang Zhengyou plane calibration method, thus completing the calibration of the camera. The calibration process is simple and has good stability and accuracy, and is highly practical.

(3) Determination of geometric constraint relationship between spatial position and images of the camera by a coordinate projection transformation method.

After the calibration of the camera is completed, according to the present disclosure, it also needs to determine the geometric constraint relationship between the spatial position and the images of the camera according to the imaging characteristic of the unmanned aerial vehicle. Taking the color chequerboard 3D calibration object being a cube calibration object as an example, according to the present disclosure, it takes diagonal points 1 to 3 of the top surface and other surfaces as labelled constraining points of photos (i.e., images of the object to be photographed) in an image sequence of the images of the cube calibration object, and a side length of a square of each check of the color chequerboard 3D calibration object is known (such as 10 cm). Therefore, the classic perspective transformation method can be used to solve the world coordinate corresponding to each point in the image, thereby measuring the distance in the space, and using a size of the check of the cube calibration object to accurately constrain a length, a width and a height during the reconstruction process.

Figure 5:
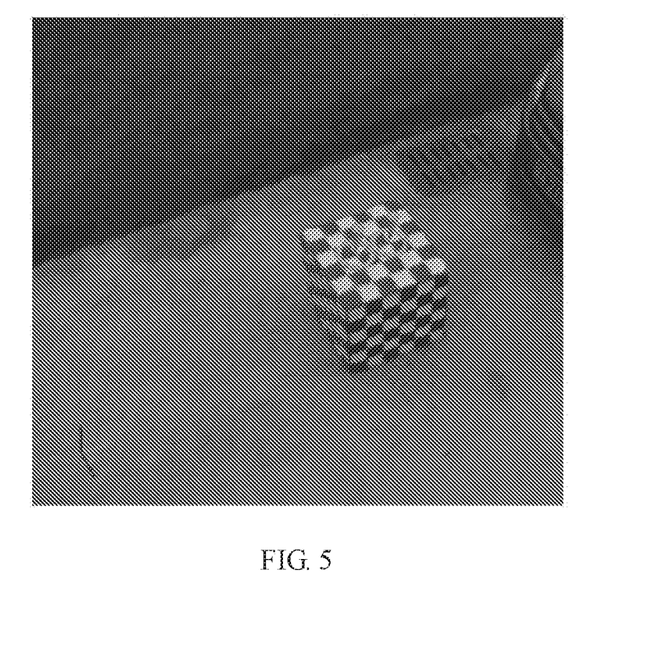
FIG. 5 is an image of the calibration object photographed by the unmanned aerial vehicle when the color chequerboard 3D calibration object is applied to conduct actual 3D reconstruction.

As shown in FIG. 5, in a scene of 3D reconstruction, the color chequerboard 3D calibration object can be used to easily distinguish different surfaces, thereby conducting length constraint to the size of any measurement direction. After selecting two 3D points in the space, the two constraint points need to be corrected in at least three images, and the constraint will be more accurate when more images are involved in the correction. Meanwhile, any known measuring value from a ground manual measurement can be used as the size constraint in the scene to be photographed.

According to the present disclosure, it's possible to photograph the cube calibration object from any angle using the color chequerboard 3D calibration object, other methods have a stricter requirement on the placement or movement of the calibration object (for example, the calibration object needs to be placed above the actual object to be photographed, etc.), the color chequerboard 3D calibration object is more suitable for the camera calibration while photographing at multiple angles in space by the unmanned aerial vehicle, and the checkerboard in different colors is also beneficial for observation and recognition after a scene reconstruction; and in addition, the standard side length of a check in the checkerboard of the color chequerboard 3D calibration object also contributes a greater precision improvement on spatial proportion constraint correction of a reconstructed model.

The present disclosure provides a method which has the advantages of simple structure, high detection precision, convenient placement, strong universality, low cost and convenient use, and can meet the requirements on the calibration object and the calibration of the internal parameters of the camera for 3D scene reconstruction of the sequence images photographed by the unmanned aerial vehicle. Specifically, the method has the following advantages:

1) A new-type color chequerboard 3D calibration object is used, which can be used for auxiliary calibration when the images are photographed at multiple angles by the unmanned aerial vehicle to conduct 3D reconstruction.

2) A new color rendering scheme for the surface of the color chequerboard 3D calibration object is proposed, which can effectively distinguish different surfaces, so as to facilitate accurate spatial position calibration in 3D reconstruction.

3) A linear camera internal parameter self-calibration method based on the color chequerboard 3D calibration object is proposed, the images of the color chequerboard 3D calibration object only needs to be photographed from three or more different orientations, and the vanishing point theory can be used to linearly solve the internal parameters of the camera, which is faster.

4) The spatial position of the camera of the unmanned aerial vehicle can be estimated from the color chequerboard 3D calibration object through the coordinate projection transformation, and the geometric constraint during 3D reconstruction can be conducted, so that the method is very convenient to use.

5) The cube calibration object can be photographed from any angle using the color chequerboard 3D calibration object, other methods have a stricter requirement on the placement or movement of the calibration object (for example, the calibration object needs to be placed above the photographed object, etc.), the color chequerboard 3D calibration object is more suitable for the camera calibration while photographing at multiple angles in space by the unmanned aerial vehicle, and the checkerboard in different colors is also beneficial for observation and recognition after the scene reconstruction; and in addition, the standard side length of a check in the checkerboard of the color chequerboard 3D calibration object also contributes a greater precision improvement on spatial proportion constraint correction of the reconstructed model.

The above are detailed descriptions of the preferred embodiments of the present disclosure, but the present disclosure is not limited to the embodiments, various equivalent deformations or substitutions can be made by those skilled in the art without departing from the nature of the present disclosure, and these equivalent deformations or substitutions are all included in the scope defined by the claims of the present application.

The invention claimed is:

1. An unmanned aerial vehicle calibration method based on a color 3D calibration object, comprising the following steps of:
placing a color chequerboard 3D calibration object in a scene to be photographed, wherein the color chequerboard 3D calibration object is a closed 3D structure, the color chequerboard 3D calibration object comprises at least a top surface and a side surface, each surface of the color chequerboard 3D calibration object adopts a chequerboard image in color and white, color and black, two different colors, or black and white, wherein color combinations of the chequerboard images between any two adjacent surfaces are different, the colors of the chequerboard image on the surface of the color chequerboard 3D calibration object are combined in a way that the surface of the color chequerboard 3D calibration object adopts a chequerboard image in color and white, and an adjacent surface adopts a chequerboard image of two different colors; if the color chequerboard 3D calibration object is a 3D calibration object composed of a regular polyhedron, a total number Q of non-white colors needed thereof meets a condition: $3 \leq Q \leq maxPi$, wherein, $maxPi=\max\{Pi|i=1, 2, \ldots, b\}$, b is a number of angle points of the color chequerboard 3D calibration object, b<e, e is a total number of surfaces of the color chequerboard 3D calibration object, Pi is a number of surfaces corresponding to any angle point i in the color chequerboard 3D calibration object and containing the angle point i, and maxPi is a maximum number of common angle point planes of the color chequerboard 3D calibration object and if the color chequerboard 3D calibration object is a regular cube without an angle point, the number of colors needed thereof is the same as the number of surfaces;
using an unmanned aerial vehicle to photograph images of the color chequerboard 3D calibration object from at least three different orientations;
using a vanishing point theory to linearly solve internal parameters of a camera of the unmanned aerial vehicle according to the photographed images of the color chequerboard 3D calibration object; and
using a coordinate projection transformation method to determine a geometric constraint relationship between a spatial position and the images of the camera of the unmanned aerial vehicle according to the internal parameters of the camera of the unmanned aerial vehicle.

2. The unmanned aerial vehicle calibration method based on a color 3D calibration object according to claim 1, wherein the color chequerboard 3D calibration object comprises but is not limited to a cube, a cuboid, a hexagonal prism, a hemisphere, and a cylinder.

3. The unmanned aerial vehicle calibration method based on a color 3D calibration object according to claim 2, wherein the step of using the vanishing point theory to linearly solve the internal parameters of the camera of the unmanned aerial vehicle according to the photographed images of the color chequerboard 3D calibration object comprises:
determining a model of the camera of the unmanned aerial vehicle and a mapping relationship between a homogeneous coordinate of a spatial point and a homogeneous coordinate of an image point; if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and
using least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

4. The unmanned aerial vehicle calibration method based on a color 3D calibration object according to claim 1, wherein the step of using the vanishing point theory to linearly solve the internal parameters of the camera of the unmanned aerial vehicle according to the photographed images of the color chequerboard 3D calibration object comprises:

determining a model of the camera of the unmanned aerial vehicle and a mapping relationship between a homogeneous coordinate of a spatial point and a homogeneous coordinate of an image point; if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and using least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

5. The unmanned aerial vehicle calibration method based on a color 3D calibration object according to claim 1, wherein the top surface of the color chequerboard 3D calibration object adopts a chequerboard image in red and white or in red and black, and a side surface of the color chequerboard 3D calibration object adopts a chequerboard image in color other than red and white, or in black and white.

6. The unmanned aerial vehicle calibration method based on a color 3D calibration object according to claim 5, wherein the step of using the vanishing point theory to linearly solve the internal parameters of the camera of the unmanned aerial vehicle according to the photographed images of the color chequerboard 3D calibration object comprises:

determining a model of the camera of the unmanned aerial vehicle and a mapping relationship between a homogeneous coordinate of a spatial point and a homogeneous coordinate of an image point; if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and using least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

7. The unmanned aerial vehicle calibration method based on a color 3D calibration object according to claim 1, wherein four adjustable lining feet or table-shaped trays are installed on a bottom surface of the color chequerboard 3D calibration object, and a bubble level is embedded in a top portion of the color chequerboard 3D calibration object.

8. The unmanned aerial vehicle calibration method based on a color 3D calibration object according to claim 7, wherein the step of using the vanishing point theory to linearly solve the internal parameters of the camera of the unmanned aerial vehicle according to the photographed images of the color chequerboard 3D calibration object comprises:

determining a model of the camera of the unmanned aerial vehicle and a mapping relationship between a homogeneous coordinate of a spatial point and a homogeneous coordinate of an image point; if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and using least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

9. The unmanned aerial vehicle calibration method based on a color 3D calibration object according to claim 1, wherein the step of using the vanishing point theory to linearly solve the internal parameters of the camera of the unmanned aerial vehicle according to the photographed images of the color chequerboard 3D calibration object comprises:

determining a model of the camera of the unmanned aerial vehicle and a mapping relationship between a homogeneous coordinate of a spatial point and a homogeneous coordinate of an image point; if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and using least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

10. An unmanned aerial vehicle calibration system based on a color 3D calibration object, comprising:

a placing module configured to place a color chequerboard 3D calibration object in a scene to be photographed, wherein the color chequerboard 3D calibration object is a closed 3D structure, the color chequerboard 3D calibration object comprises at least a top surface and a side surface, each surface of the color chequerboard 3D calibration object adopts a chequerboard image in color and white, color and black, two different colors, or black and white, wherein color combinations of the chequerboard images between any two adjacent surfaces are different, the colors of the chequerboard image on the surface of the color chequerboard 3D calibration object are combined in a way that the surface of the color chequerboard 3D calibration object adopts a chequerboard image in color and white, and an adjacent surface adopts a chequerboard image of two different colors; if the color chequerboard 3D calibration object is a 3D calibration object composed of a regular polyhedron, a total number Q of non-white colors needed thereof meets a condition: $3 \leq Q \leq maxPi$, wherein, $maxPi=\max\{Pi|i=1, 2, \ldots, b\}$, b is a number of angle points of the color chequerboard 3D calibration object, $b<e$, e is a total number of surfaces of the color chequerboard 3D calibration object, Pi is a number of surfaces corresponding to any angle point i in the color chequerboard 3D calibration object and containing the angle point i, and maxPi is a maximum number of common angle point planes of the color chequerboard 3D calibration object and if the color chequerboard 3D calibration object is a regular cube without an angle point, the number of colors needed thereof is the same as the number of surfaces;

a photographing module configured to use an unmanned aerial vehicle to photograph images of the color chequerboard 3D calibration object from at least three different orientations;

an internal parameter solving module configured to use a vanishing point theory to linearly solve internal parameters of a camera of the unmanned aerial vehicle according to the photographed images of the color chequerboard 3D calibration object; and a coordinate projection conversion module configured to determine a geometric constraint relationship between a spatial position and the images of the camera of the unmanned aerial vehicle according to the internal parameters of the camera of the unmanned aerial vehicle.

11. The unmanned aerial vehicle calibration system based on a color 3D calibration object according to claim 10, wherein: the internal parameter solving module comprises:

an initializing unit configured to determine a model of the camera of the unmanned aerial vehicle and a mapping relationship between a homogeneous coordinate of a spatial point and a homogeneous coordinate of an image point: if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and a solving unit configured to use least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

12. The unmanned aerial vehicle calibration system based on a color 3D calibration object according to claim 10, wherein: four adjustable lining feet or table-shaped trays are installed on a bottom surface of the color chequerboard 3D calibration object, and a bubble level is embedded in a top portion of the color chequerboard 3D calibration object.

13. The unmanned aerial vehicle calibration system based on a color 3D calibration object according to claim 12, wherein: the internal parameter solving module comprises:

an initializing unit configured to determine a model of the camera of the unmanned aerial vehicle and a mapping relationship between a homogeneous coordinate of a spatial point and a homogeneous coordinate of an image point: if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and a solving unit configured to use least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

14. The unmanned aerial vehicle calibration system based on a color 3D calibration object according to claim 10, wherein: the internal parameter solving module comprises:

an initializing unit configured to determine a model of the camera of the unmanned aerial vehicle and a mapping relationship between a homogeneous coordinate of a spatial point and a homogeneous coordinate of an image point: if the model of the camera of the unmanned aerial vehicle is a pinhole camera model, an expression of the mapping relationship between the homogeneous coordinate M of the spatial point for any spatial point P and the homogeneous coordinate m of the image point is: $\lambda m = K[RT]M$, wherein, $\lambda$ is a given scale factor, K is an internal parameter matrix of the camera of the unmanned aerial vehicle, R is a rotation matrix from a world coordinate system to a camera coordinate system, and T is a translation vector from the world coordinate system to the camera coordinate system; and a solving unit configured to use least square method and Zhang Zhengyou plane calibration method to linearly solve the internal parameter matrix of the camera of the unmanned aerial vehicle according to the photographed images of the color chequerboard 3D calibration object and a constraint equation of the vanishing point theory.

* * * * *